Feb. 7, 1939.   H. R. TEAR   2,146,385
LUBRICATING DEVICE
Filed Sept. 19, 1936

INVENTOR.
HARRY R. TEAR
BY McConkey & Booth
ATTORNEYS

Patented Feb. 7, 1939

2,146,385

UNITED STATES PATENT OFFICE 2,146,385

LUBRICATING DEVICE

Harry R. Tear, Evanston, Ill., assignor to The Lubrication Corporation, Chicago, Ill., a corporation of Delaware Application September 19, 1936, Serial No. 101,575

8 Claims. (Cl. 285—97)

This invention relates to lubricating devices and more particularly to angularly adjustable lubricant discharge nozzles and to locking means therefor.

One of the objects of the present invention is to provide an angularly adjustable discharge nozzle including locking means which can be operated without causing relative axial movement of the nozzle parts.

Another object of the invention is to provide an angularly adjustable nozzle which is simple and cheap to construct and is positive in operation.

Other objects, advantages and novel features of the invention will be apparent from the following detail description when read in connection with the accompanying drawing, in which.

Figure 1:
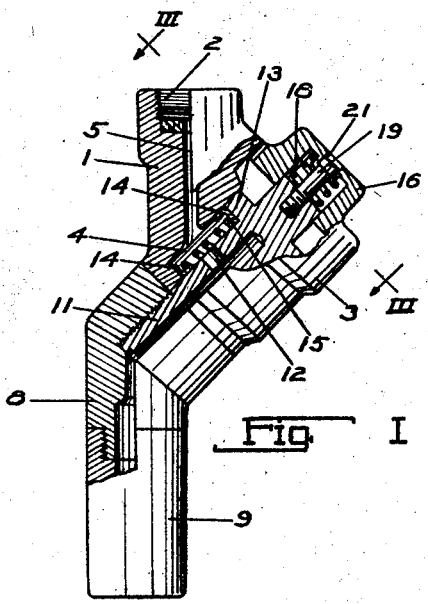
Figure 1 is a side view, with parts in section, of a lubricant discharge nozzle embodying the invention.

The nozzle illustrated is somewhat similar to the nozzle disclosed and claimed in my copending application Serial No. 46,640, and comprises a rigid conduit member 1 formed at one end with a screw threaded socket 2 for attachment to any suitable type of lubricant dispenser such, for example, as the grease gun disclosed in my above mentioned application. The conduit member 1 terminates at its opposite end in a head portion 3 formed with a cylindrical bore 4 whose axis is arranged at an acute angle, preferably between 40° and 50°, to the axis of the conduit member 1. The socket 2 and bore 4 are connected by a lubricant passage 5 whereby lubricant forced into the socket may flow freely into the bore 4. The outer end of the bore 4 is enlarged as indicated at 6 and is formed with a series of peripheral locking teeth 7 for a purpose to appear later.

A nozzle member 8 is adapted to be secured to the conduit member 1 and is formed with an angular bend equal to the angle between the conduit member 1 and the cylindrical bore 4. The nozzle member 8 carries a suitable nozzle 9 of any desired type which is formed for sealing engagement with a lubricant receiving fitting and is attached to the conduit member 1 by means of a tubular plug 11 having an opening 12 communicating with the cylindrical bore 4. The plug 11 is screw-threaded to the member 8 and is formed with an enlarged circular flange 13 of substantially the same diameter as the diameter of the bore 4. If desired, suitable sealing washers 14 may be provided between the bore 4 and the member 11 to prevent leakage of lubricant therebetween, the washers 14 being held in place by a suitable spring 15.

Figure 3:
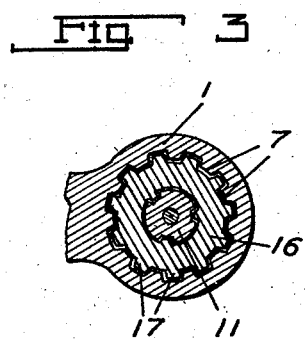
Figure 3 is a partial section on the line III—III of Figure 1.

In order to lock the nozzle member 1 and the conduit member 8 against relative rotation, a locking member 16 is splined to the outer end of the member 11 as best seen in Figure 3 and is formed around its periphery with a series of locking teeth 17 for engagement with the teeth 7. The locking member 16 is urged outwardly of the member 11 by a coil spring 18 and is retained thereon by a suitable bolt 19 secured to the member 11 and having an enlarged head lying within a depression 21 in the locking member 16.

The parts will normally occupy the position shown in Figure 1 in which the spring 18 urges the locking member 16 outwardly of the member 11 to the full extent of the movement permitted by the bolt 19. In this position the teeth 7 and 17 are in register to prevent relative rotation between the conduit member 1 and the locking member 16. Since the locking member 16 is splined to the member 11, relative rotation of member 11 and the conduit member 1 will also be prevented and the nozzle member 8 and nozzle 9 will be held against movement relative to the member 1.

Figure 2:
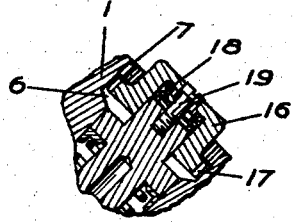
Figure 2 is a partial view similar to Figure 1 showing parts in a different position.

When it is desired to adjust the relative annular positions of members 1 and 8 the locking member 16 may be forced inwardly against the spring 18 to the position shown in Figure 2 in which the teeth 7 and 17 are out of register. In this position the nozzle member 8 may be rotated freely relative to the conduit member 1 to any desired position. Upon release of the locking member 16, the spring 18 will again urge it outwardly to the position of Figure 1 whereby the teeth 7 and 17 will again register and will lock the members 1 and 8 against further relative movement.

It will be noted that during the locking and unlocking operations there is no relative movement between the members 1 and 8 and that the space in the bore 4 around the member 11 will not be decreased. Thus the locking and unlocking operation may be performed without causing undesirable discharge of lubricant in the nozzle.

Figure 4:
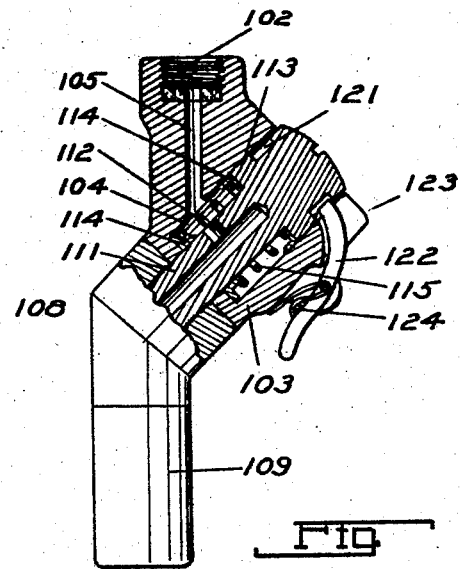
Figure 4 is a side view with parts in section of a modified form of invention.

Figure 4 illustrates a modified construction, parts therein corresponding to like parts in Figures 1 to 3 being indicated by the same reference numbers plus 100. In this form the plug member 111 is formed adjacent the end thereof which lies closest to the outer end of the recess 104 with a peripheral series of locking teeth 121 and the conduit member 103 pivotally carries a locking pawl 122 one end of which extends through a slot 123 in the conduit member to engage the teeth 121. If desired a spring 124 may be provided to urge the pawl into locking position.

The pawl 122 normally occupies the position shown in Figure 4 in which it engages the teeth 121 to lock the nozzle and conduit members against relative rotation. When it is desired to adjust the relative angular position of these members the free end of the pawl may be depressed to release the teeth 121 to permit rotation of the plug 111 in the recess 104. After the nozzle member has been turned to the desired position the pawl may be released whereupon the spring 124 will again move it into locking position.

While only two embodiments of the invention have been shown and described, it will be apparent that many changes might be made therein and it is not intended to be limited to the exact forms shown or otherwise than by the terms of the appended claims.

I claim:

1. A lubricant discharge nozzle comprising, a rigid conduit member, a rigid nozzle member having means for sealing engagement with a lubricant receiving fitting, means forming a swivel connection between said members whereby their angular relationship may be changed, a series of locking teeth on one of said members, and a locking element slidably carried by the other member and having locking teeth adapted to engage said first named locking teeth to hold said members against relative rotation, said element being adapted to be moved to a position with said locking teeth out of engagement whereby said members may be rotated about said swivel connection.

2. A lubricant discharge nozzle comprising, a conduit member formed with a lubricant passage and a cylindrical recess whose axis lies at an angle to the conduit member, a nozzle member having means formed for sealing engagement with a lubricant receiving fitting and having a portion at an angle equal to the angle between the conduit and recess and lying in and forming a lubricant tight seal with said recess, said nozzle member being formed with a lubricant passage communicating with the passage in said conduit member, and a locking element slidably mounted on said portion of the nozzle member and engageable with the conduit member to lock said members against relative rotation.

3. A lubricant discharge nozzle comprising, a conduit member formed with a lubricant passage and a cylindrical recess whose axis lies at an angle to the conduit member, a nozzle member having means formed for sealing engagement with a lubricant receiving fitting and having a portion at an angle equal to the angle between the conduit and recess and lying in and forming a lubricant tight seal with said recess, said nozzle member being formed with a lubricant passage communicating with the passage in said conduit member, a series of locking teeth formed on the conduit member, and a locking element slidably mounted on said portion of the nozzle member and formed with locking teeth to engage said first named teeth to lock said members against relative rotation.

4. A lubricant discharge nozzle comprising, a conduit member formed with a lubricant passage and a cylindrical recess whose axis lies at an angle to the conduit member, a nozzle member having means formed for sealing engagement with a lubricant receiving fitting and having a portion at an angle equal to the angle between the conduit and recess and lying in and forming a lubricant tight seal with said recess, said nozzle member being formed with a lubricant passage communicating with the passage in said conduit member, a series of locking teeth on the conduit member adjacent the outer end of said recess, a locking element splined on said portion of the nozzle member and having a series of locking teeth adapted, in one position of the element, to engage said first-named teeth to lock said members against relative rotation and, in another position of the element, to disengage the first-named teeth to permit relative rotation of the members, and resilient means to urge said element toward said one position.

5. A lubricant discharge nozzle comprising a conduit member formed with a lubricant passage and a cylindrical recess, the axis of said recess lying at an angle to the axis of the conduit member, a nozzle member formed with an angle equal to the angle between the conduit and recess axes, and having means for sealing engagement with a lubricant receiving fitting, a plug member secured to said nozzle member and having an enlarged portion lying in and sealingly engaging the walls of said recess, said nozzle member and plug member being formed with a lubricant passage communicating with the passage in the conduit member, and means movable relatively to both the conduit and plug members for locking said members against relative rotation.

6. A lubricant discharge nozzle comprising a conduit member formed with a lubricant passage and a cylindrical recess, the axis of said recess lying at an angle to the axis of the conduit member, a nozzle member formed with an angle equal to the angle between the conduit and recess axes, and having means for sealing engagement with a lubricant receiving fitting, a plug member secured to said nozzle member and having an enlarged portion lying in and sealingly engaging the walls of said recess, said nozzle member and plug member being formed with a lubricant passage communicating with the passage in the conduit member, means on the plug member forming a series of locking teeth, and means movably mounted on the conduit member adjacent the outer end of said recess and movable into engagement with said teeth to lock said members against relative rotation.

7. A lubricant discharge nozzle comprising a rigid conduit member having a cylindrical recess whose axis lies at an angle to the conduit member, a rigid nozzle member having means for sealing engagement with a lubricant receiving fitting and carrying a part at an angle equal to the angle between the conduit and recess and projecting into and forming a seal with said recess, said part and said recess forming a swivel joint, one of said members being formed with a series of locking teeth, and a pawl pivotally mounted on the other of said members and engageable with said teeth to lock said members against relative rotation.

8. A lubricant discharge nozzle comprising a rigid conduit member having a cylindrical recess whose axis lies at an angle to the conduit member, a rigid nozzle member having means for sealing engagement with a lubricant receiving fitting and carrying a part at an angle equal to the angle between the conduit and recess and projecting into and forming a seal with said recess, said part and said recess forming a swivel joint, a series of locking teeth formed on said plug adjacent the outer end of said recess, and a pawl pivoted on the conduit member and engageable with said locking teeth to lock said members against relative rotation.

HARRY R. TEAR.